United States Patent
Misra et al.

(10) Patent No.: US 11,868,704 B2
(45) Date of Patent: Jan. 9, 2024

(54) METHOD APPARATUS, AND COMPUTER READABLE MEDIUM FOR DEFINING AND ENCODING PACKETS FOR DATA EXCHANGE OVER A NETWORK

(71) Applicant: Infinera Corporation, Sunnyvale, CA (US)

(72) Inventors: Mohit Misra, Bangalore (IN); Prakash Singh Bisht, Bangalore (IN); Ashwini Kumar Bhat, Bangalore (IN)

(73) Assignee: Infinera Corporation, San Jose, CA (US)

(*) Notice: Subject to any disclaimer, the term of this patent is extended or adjusted under 35 U.S.C. 154(b) by 213 days.

(21) Appl. No.: 15/639,994

(22) Filed: Jun. 30, 2017

(65) Prior Publication Data
US 2019/0007238 A1   Jan. 3, 2019

(51) Int. Cl.
  *G06F 40/14*   (2020.01)
  *G06F 16/13*   (2019.01)
  *H04L 12/54*   (2022.01)
  *H04L 45/02*   (2022.01)
  *H04L 45/48*   (2022.01)
  *G06F 8/41*    (2018.01)
  *H04L 12/66*   (2006.01)

(52) U.S. Cl.
  CPC .............. *G06F 40/14* (2020.01); *G06F 16/13* (2019.01); *H04L 12/56* (2013.01); *H04L 45/10* (2013.01); *H04L 45/48* (2013.01); *G06F 8/41* (2013.01); *H04L 12/66* (2013.01)

(58) Field of Classification Search
  CPC ......... H04L 12/56; H04L 12/66; H04L 45/10; H04L 45/48; C12N 9/90; C12P 19/24; G06F 17/2247; G06F 40/14; G06F 16/13; G06F 8/41
  USPC ......................................................... 370/427
  See application file for complete search history.

(56) References Cited

U.S. PATENT DOCUMENTS

| | | | |
|---|---|---|---|
| 6,356,951 B1* | 3/2002 | Gentry, Jr. ............ | H04L 69/161 |
| | | | 709/217 |
| 2007/0091886 A1* | 4/2007 | Davis .................. | H04L 63/0485 |
| | | | 370/389 |
| 2007/0240047 A1* | 10/2007 | Kosov ....................... | G06F 8/34 |
| | | | 715/700 |
| 2007/0260615 A1* | 11/2007 | Shen ....................... | H04L 67/06 |
| 2010/0324956 A1* | 12/2010 | Lopez ................. | G06F 17/5004 |
| | | | 705/7.37 |
| 2012/0144405 A1* | 6/2012 | Kalagananam ....... | G06F 9/4493 |
| | | | 719/316 |
| 2017/0052738 A1* | 2/2017 | Shimmitsu ............ | G06F 3/0611 |
| 2018/0025478 A1* | 1/2018 | Lee ........................... | G06T 5/50 |
| | | | 382/284 |

* cited by examiner

*Primary Examiner* — Omar J Ghowrwal
(74) *Attorney, Agent, or Firm* — David L. Soltz (57) ABSTRACT

Systems, methods, and devices for encoding and decoding a packet buffer for data exchange over a communications network, including parsing a data container definition file to determine a packet format; generating a code file based on the data container definition file; inserting the code file into a source tree of an application; compiling the source tree to generate an executable file; and executing the executable on a computing device in communication with the communications network, wherein the executable file encodes and decodes the packet buffer for data exchange over the communications network.

21 Claims, 10 Drawing Sheets

```
package component.tlvdef.example;
import component.tlvdef.example.ExampleConst;
import component.tlvdef.example.ExamplePktHdr;
import component.tlvdef.example.ExampleTlv;
import component.tlvdef.example.ExampleItem;
import component.tlvdef.example.ExampleAnotherPkt
;
PKT ExamplePkt
{
█
}
                              10,0-1        All
```

FIG. 5

```
package component.tludef.example;
import component.tludef.example.ExampleConst;
import component.tludef.example.ExamplePktHdr;
import component.tludef.example.ExampleItem;
import component.tludef.example.ExampleAnotherPkt;
import component.tludef.example.ExampleAnotherTlv;

TLV(ExampleConst.TlvId1) ExampleTlv
{
}
```

10,4          All

FIG. 6

```
package component.tludef.test;
import component.tludef.test.TestConst;
OBJ(TestConst.ClassId1:TestConst.Ctype1) Test1Obj
{
    uint8 member1=0;
    uint32 member2|;
}
```

-- INSERT --                                6,15        All

FIG. 7

```
package component.tlvdef.example;
import component.tlvdef.example.ExampleConst;
import component.tlvdef.example.ExamplePktHdr;
import component.tlvdef.example.ExampleTlv;
import component.tlvdef.example.ExampleItem;
import component.tlvdef.example.ExampleAnotherPkt;

PKT ExamplePkt
{ constrawbuf[100] TestConstRawBuf1;
  constrawbuf[ExampleConst.ConstU8] TestConstRawBuf2;

listitem[100] (ExampleItem) TestList;

listitem[ExampleConst.ConstU8] (ExampleItem) TestList1 refpkt (ExampleAnotherPkt) TestOtherPkt;
  refpkthdr (ExamplePktHdr) TestPktHdr;
  reftlv (ExampleAnotherTlv) TestTlv;
  listtlv[ExampleConst.ConstU8] (ExampleTlv) TestTlvList;

}
~
~
                                            11,3         All
```

FIG. 8

```
import component.tlvdef.example.ExampleConst;
import component.tlvdef.example.ExamplePktHdr;
import component.tlvdef.example.ExampleTlv;
import component.tlvdef.example.ExampleItem;
import component.tlvdef.example.ExampleAnotherPkt;

PKT ExamplePkt
{
    reftlv[0] (ExampleAnotherTlv1) TestTlv1;
    reftlv[M] (ExampleAnotherTlv2) TestTlv2;
    reftlv (ExampleAnotherTlv3) TestTlv3;
}
```

3,4     Bot

FIG. 9

METHOD APPARATUS, AND COMPUTER READABLE MEDIUM FOR DEFINING AND ENCODING PACKETS FOR DATA EXCHANGE OVER A NETWORK

FIELD

The disclosed embodiments are generally related to communications networking.

BACKGROUND

In communications systems, data is usually communicated from a sending device to a receiving device in a structured manner so that the recipient system can understand it correctly. The sending device and receiving device typically agree on a predefined structure for the data before the data is sent. For example, it is a standard practice is to send bytes in "network byte order" over a communications network.

In Transmission Control Protocol/Internet Protocol (TCP/IP) networking there are many protocols which define a particular way of structuring the data for sending over the network (e.g., Open Shortest Path First (OSPF), Border Gateway Protocol (BGP), Routing Information Protocol (RIP), Intermediate System-Intermediate System protocol (IS-IS), Resource Reservation Protocol (RSVP) etc). These structures are defined in their respective Request for Comment (RFC) documents as protocol specifications. For example OSPF specifies sending data in a type-length-value (TLV) while RSVP specifies sending data in the form of an object (OBJ).

SUMMARY

Some implementations provide a method for encoding and decoding a packet buffer for data exchange over a communications network. The method includes parsing a data container definition file to determine a packet format; generating a code file based on the data container definition file; inserting the code file into a source tree of an application; compiling the source tree to generate an executable file; executing the executable on a computing device in communication with the communications network. The executable file encodes and decodes the packet buffer for data exchange over the communications network.

In some implementations, the data container definition file comprises a container object. In some implementations, the data container definition file comprises a member. In some implementations, the data container definition file specifies a path to a container object in another file. In some implementations, the code file comprises a class based on the data container definition file. In some implementations, a maximum packet size is calculated based on the data container definition file. In some implementations, the data container definition file specifies the packet format for a communications protocol.

Some implementations provide a device for encoding and decoding a packet buffer for data exchange over a communications network. The device includes processing circuitry and memory circuitry in communication with the processing circuitry. The processing circuitry is configured to parse a data container definition file to determine a packet format and to generate a code file based on the data container definition file. The processing circuitry is also configured to insert the code file into a source tree of an application, and to compile the source tree to generate an executable file. The processing circuitry is also configured to execute the executable file to encode and decode the packet buffer for data exchange over the communications network.

In some implementations, the data container definition file comprises a container object. In some implementations, the data container definition file comprises a member. In some implementations, the data container definition file specifies a path to a container object in another file. In some implementations, the code file comprises a class based on the data container definition file. In some implementations, the processing circuitry is further configured to calculate a maximum packet size based on the data container definition file. In some implementations, the data container definition file specifies the packet format for a communications protocol.

Some implementations provide a non-transitory computer readable medium storing instructions to execute on processing circuitry to parse a data container definition file to determine a packet format; generate a code file based on the data container definition file; insert the code file into a source tree of an application; compile the source tree to generate an executable file; and execute the executable on a computing device in communication with the communications network so that the executable file encodes and decodes the packet buffer for data exchange over the communications network.

In some implementations the data container definition file comprises a container object. In some implementations the data container definition file comprises a member. In some implementations the data container definition file specifies a path to a container object in another file. In some implementations the code file comprises a class based on the data container definition file. In some implementations data container definition file specifies the packet format for a communications protocol.

DETAILED DESCRIPTION OF THE PREFERRED EMBODIMENT(S)

It may be desirable to use a generic approach for implementing data transmission protocols in a given application. To this end, a defining data container file can be used to specify the format of a packet that will be exchanged with another system using the desired protocol. Such defining data container files are referred to as ".Ob" files herein; however any suitable file extension or naming convention can be used. The .Ob files are created for a specific application based on the needs of that application (e.g., to define a particular packet that the application needs to communicate using a particular communications protocol.) The .Ob files can then be processed using a packet code generator. The packet code generator parses the .Ob file and generates code for encoding and decoding data in order to send and receive packets according to the desired protocol. The code can be generated in any suitable language, such as C++, Java, or other high-level language. For exemplary purposes, this generated code will be referred to as C++ code herein. After it is generated by the packet code generator, the C++ code can be incorporated into the source tree for the application prior to compiling the application to generate its executable.

Figure 1:
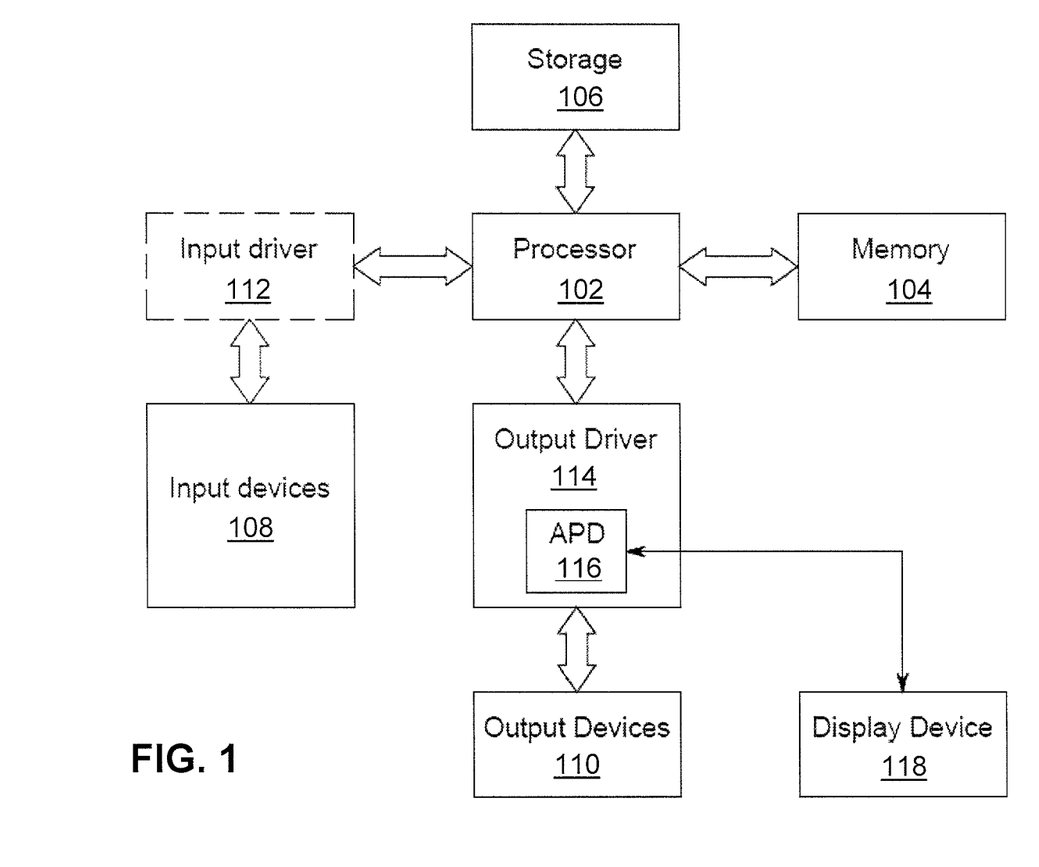
FIG. 1 is a block diagram of a computing system in which one or more disclosed embodiments may be implemented.

FIG. 1 is a block diagram of a computing system 100 in which one or more disclosed embodiments may be implemented. The computing system 100 may include, for example, a computer, a gaming device, a handheld device, a set-top box, a television, a mobile phone, or a tablet computer. The computing system 100 may include a processor 102, a memory 104, a storage 106, one or more input devices 108, and/or one or more output devices 110. The device 100 may include an input driver 112 and/or an output driver 114. The device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The storage 106 may include a non-transitory computer-readable medium. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 may communicate with the processor 102 and the input devices 108, and may permit the processor 102 to receive input from the input devices 108. The output driver 114 may communicate with the processor 102 and the output devices 110, and may permit the processor 102 to send output to the output devices 110. The output driver 116 may include an accelerated processing device ("APD") 116 which may be coupled to a display device 118. The APD may be configured to accept compute commands and graphics rendering commands from processor 102, to process those compute and graphics rendering commands, and to provide pixel output to display device 118 for display.

Figure 2A:
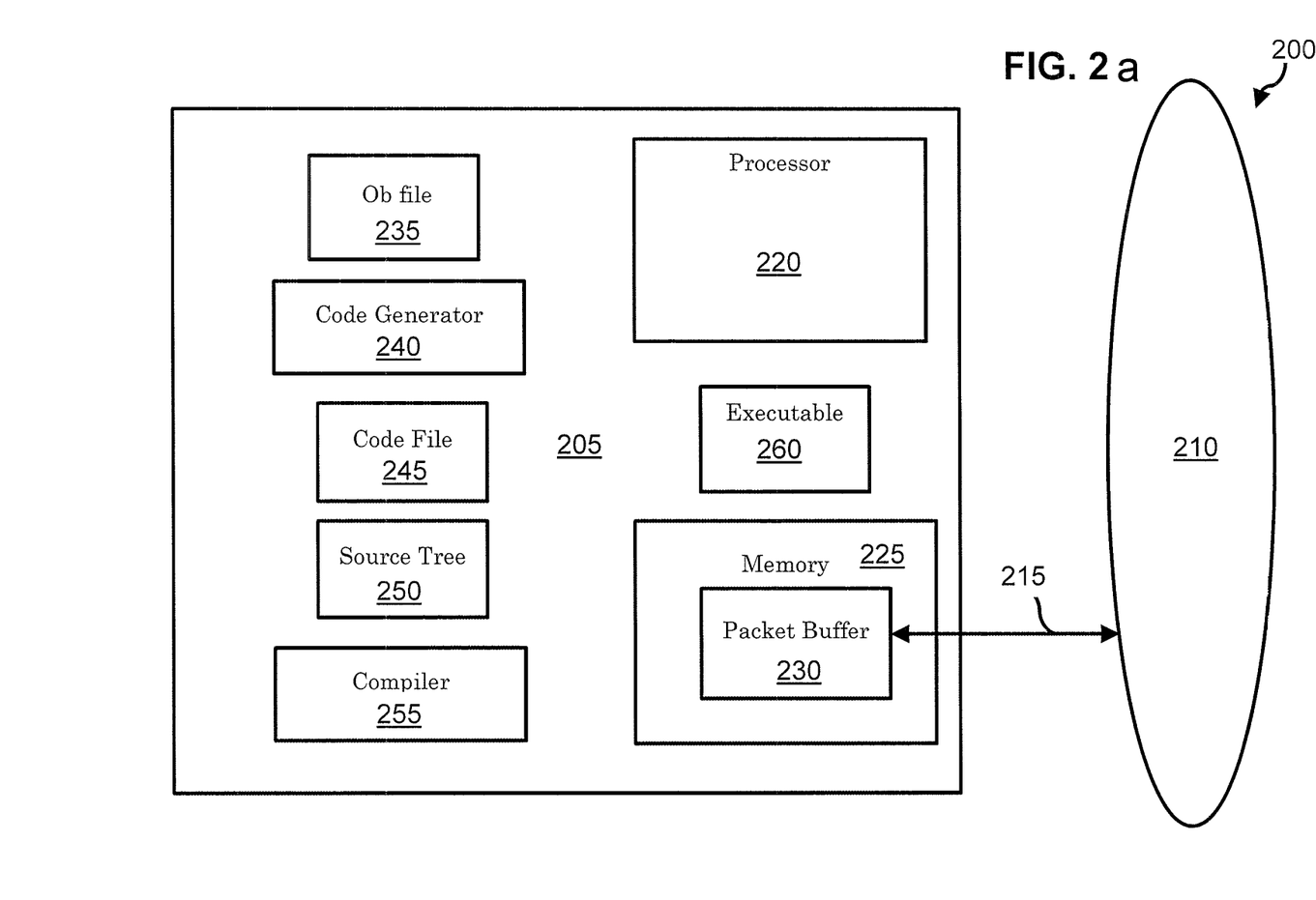
FIGS. 2a and 2b are schematics showing an example system in which the computing system of FIG. 1 may be operated in conjunction with an optical network.

FIG. 2a is a schematic showing an example system 200 in which the computing system of FIG. 1 may be operated. System 200 includes a computing device 205 in communication with a computer communications network 210 over a communications link 215. Computing device 205 can include any suitable computing device, such as computing system 100 as shown as described with respect to FIG. 1, or any of its components. Computing device 205 includes a processor 220 and a memory 225 in communication with the processor. Memory 225 may include a non-transitory computer-readable medium. A portion of memory 225 is allocated for encoding packet data for transmission to, or decoding packet data received from, optical network 210 over communications link 215, which may include an electrical connection including one or more electrical conductors, wires, or transmission lines. This portion of memory can be referred to as a packet buffer 230. Optical network 210 will be described in greater detail below with reference to FIG. 2b.

Computing device 205 holds the .Ob file 235 in memory 225 (or a disk or other non-transitory computer-readable storage). Processor 220 can execute code generator 240 to parse .Ob file 235 and output one or more code files 245. The code file 245 can be inserted into a source tree 250 of an application. Processor 220 can execute compiler 255 to compile the source tree of the application to generate an executable 260. The processor can execute executable 260, where during execution, executable 260 may encode packets using the functionality added to the executable by the .Ob file, and may write the packets to the packet buffer 230 for transmission to communications network 210 via communications link 215. Executable 260 may also read packets from packet buffer 230 which were received from communications network 210 via communications link 215, and may decode the packets using the functionality added to the executable by the .Ob file.

It is noted that in some implementations, various operations described as carried out on computing device 205 can be carried out on other computing devices, or among several computing devices. For example, in some implementations, executable 260 can be generated on computing device 205 and be executed on a different computing device, or vice versa. Various suitable combinations will be evident to those of skill in the art.

Figure 2B:
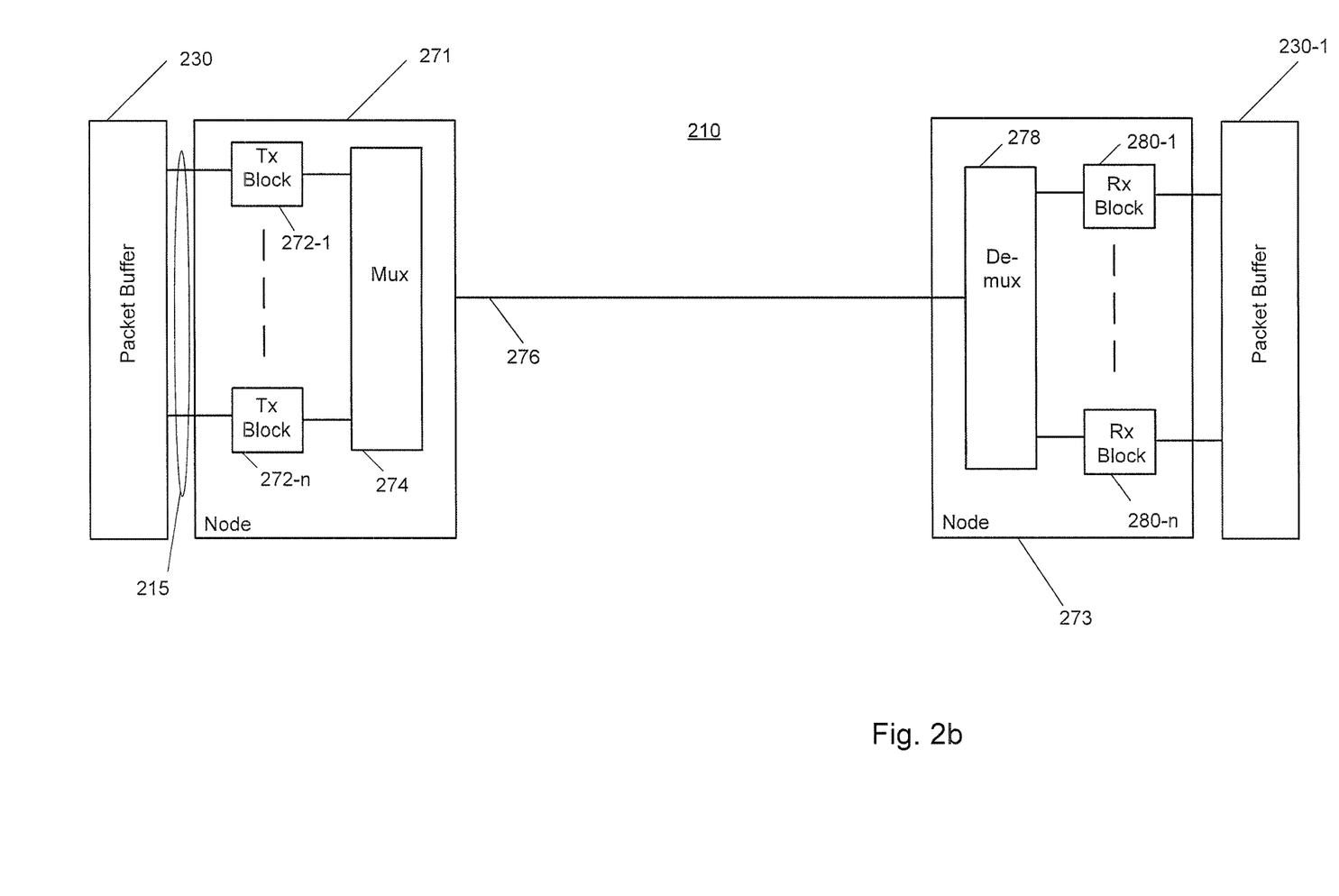

As noted above, the output of packet buffer 230 may be provided to equipment or devices in optical network 210. FIG. 2b shows an example of an optical network in greater detail. The packets output from buffer 230 may be provided to intermediate circuitry (not shown) that processes or encodes the packets. The processed or encoded packets may next be provided to a transmit node 271 including transmitters (Tx blocks 272-1 to 272-n), each of which including digital-to-analog conversion circuitry, driver circuitry, one or more lasers, and one or more optical modulators that supply optical signals modulated based on the processed packets. The modulated optical signals output from each Tx block 272-1 to 272-n may have a different wavelength and each such signal may be supplied to an optical multiplexer 274, which combines the modulated optical signals and outputs the signal onto an optical communication path 276 including one or more segments of optical fiber.

The modulated optical signals may be transmitted along optical fiber 276 to receive node 273. Optical amplifiers (not shown) may be spaced along optical communication path 276 to amplify or increase the power or intensity of the optical signals, which are typically attenuated after propagating along optical communication path 276. At receive node 273, the optical signals may be demultiplexed or separated from one another and supplied to respective receivers or receive blocks 280-1 to 280-n, which convert the received optical signal to electrical signals. The electrical signals may be processed or decoded in receive blocks 280-1 to 208-n and provided to packet buffer 230-1, which has the same or similar construction as packet buffer 230. Packet buffer 230-1 may, in turn, supply the received packets to circuitry similar to or the same as that shown in FIG. 2*a* for further processing.

Figure 3:
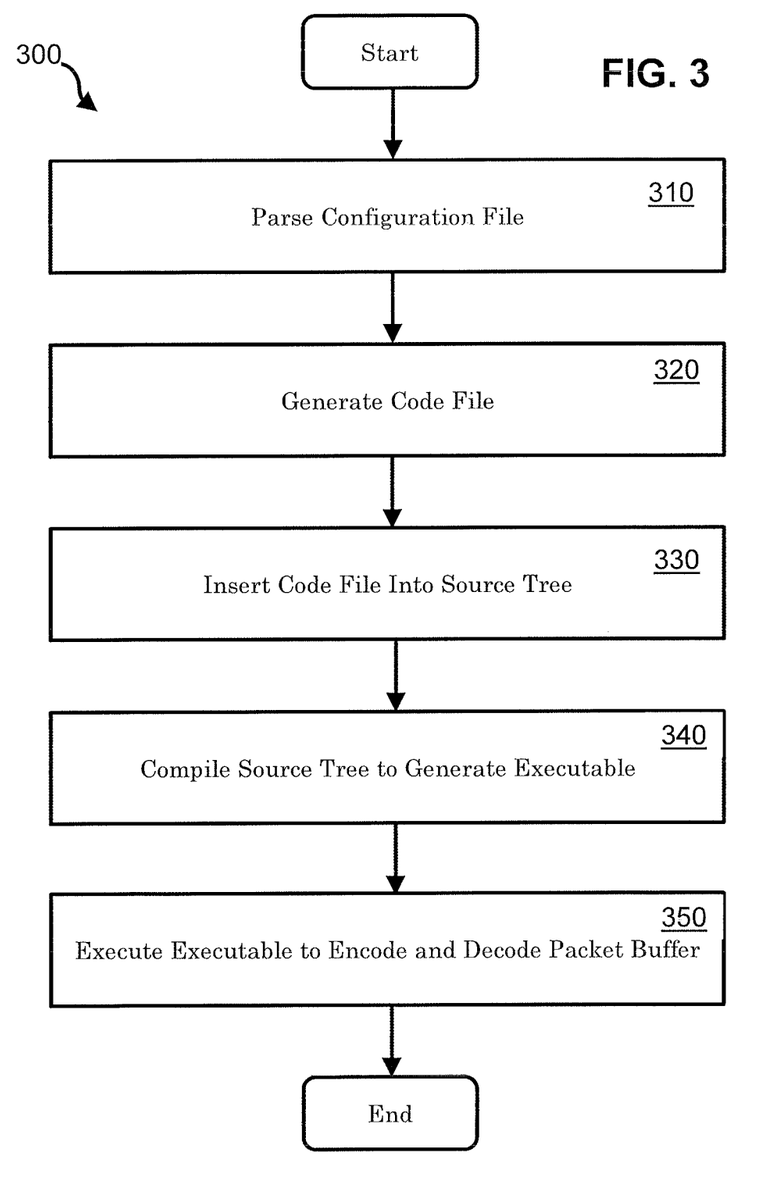
FIG. 3 is a flow chart illustrating an example method for generating code based on a data container file.

FIG. 3 is a flow chart illustrating an example method for generating code based on a data container file, e.g., using the hardware described with respect to FIGS. 2*a* and 2*b*. In step 310, a computing device executes a packet code generator to parse a .Ob packet configuration file and to generate a code file based on the .Ob file in step 320. In step 330, the computing device inserts the code file into a source tree of an application. In step 340, the computing device compiles the source tree to generate an executable for the application. In step 350, the computing device executes the executable to encode packets and write them to a packet buffer, and/or to decode packets written to the packet buffer in order to facilitate communications over a communications network using a desired protocol.

Each .Ob file can refer to a single container object. A container object is an object which contains one or more members (of other data types or container objects). The packet code generator can recognize a number of different kinds of container objects, and a user can use one, or as many of the kinds of container objects as are needed, to specify the format of packets for processing in the application. The members are objects which are contained inside container objects. Members can include basic data types, such as integers, strings, etc., as well as other container type objects. After parsing the .Ob files, the packet code generator generates C++ classes for each container object defined in the .Ob files. These C++ classes can be added to the source tree of an application to provide packet data protocol functionality.

The following example types of container objects can be recognized by an example packet code generator: PKT; DPKT; PKTHDR; TLV; DTLV; RTLV; PTLV; ITLV; OBJ; XITEM; and TLVCONST. Container objects can be added to a .Ob file based on communications protocol. For example, if it is desired for the application to communicate using OSPF, a TLV container object will be used, whereas if it is desired for the application to communicate using RSVP, an OBJ container object will be used.

PKT—A PKT container object can contain any number of members of variable sizes. If the packet code generator parses a PKT container object from a .Ob file, it generates code to encode/decode members of the PKT object into a byte buffer. A byte buffer is an area of memory allocated for encoding and/or decoding a packet. Any other suitable packet transmission and/or reception buffer in memory can be used, however the term byte buffer is used herein for exemplary purposes. The PKT container object can be described as defining a buffer containing objects of variable lengths and data types.

PKTHDR—A PKTHDR container object can contain only fixed size data types and objects. If the packet code generator parses a PKTHDR container object from a .Ob file, it generates code to encode/decode members of the PKTHDR object into a byte buffer. The PKTHDR container object can be used for faster decoding of members from the received packet buffer as compared with PKT container objects. The offset to PKTHDR members are calculated when the packet code generator generates the C++ code, and the offset is embedded into the generated code. In this context, the offset is a distance from the start of the packet to the start of the particular member. Using the offset, the value of a particular member can be found in the buffer by looking at the exact offset in the buffer.

TLVCONST—A TLVCONST container object can be used to declare constants for use in other .Ob files. Accordingly, if the packet code generator parses a TLVCONST container object from a .Ob file, it does not generate any code for encode/decode of members into a byte buffer; rather, the packet code generator will generate C++ code which declares its members as constants.

TLV—A TLV container object is identical to a PKT object except in the way it is encoded in the byte buffer. Accordingly, if the packet code generator parses a TLV container object from a .Ob file, it generates code to encode/decode members of the TLV container object into a byte buffer. A TLV container object also requires a TLV_TYPE field with a unique integer number to determine the type of the TLV object. A unique integer number is used to differentiate one type of information structured in the TLV format from another. Because TLV is a structure format, and different kinds of information exist in the TLV format, the TLV_TYPE field can be used to differentiate these types. During encoding of the TLV object into a byte buffer, the TLV_TYPE field is encoded first (e.g., the first 2 bytes of the buffer), followed by the TLV length (e.g., the next 2 bytes), and then the members of the TLV object are encoded. The TLV length can be set to be the length of the contents of the TLV (excluding the length of TLV type and TLV length fields). During encoding, the packet code generator can also align the buffer length at a 4 byte boundary for padding. Typically it is more efficient to allocate a buffer on a 4 byte boundary; however the required size of a TLV may cause it not to align with a 4 byte boundary. Accordingly, the packet code generator calculates the correct amount of padding to add to the buffer used to encode/decode the TLV packet such that the packet aligns with a 4 byte boundary.

RTLV—A RTLV container object is identical to a TLV object in all respects except in that the length field (RTLV_LENGTH) indicates the total length of the complete TLV (i.e., including the length of TLV type and TLV length fields). This can be used in order to satisfy the requirements of a particular object defined in the RSVP protocol, for example.

PTLV—A PTLV container object is identical to the RTLV object in all respects except in that the length and type fields are encoded as 1 byte. This can also be used in order to satisfy the requirements of a particular object defined in the RSVP protocol, for example.

ITLV—An ITLV container object is identical to a TLV object in all respects except in that the length field indicates padded content length (aligned to a 4 byte boundary) rather than the actual content length.

OBJ—An OBJ container object can be used, e.g., to support RSVP object types. The OBJ container object is identical to the PKT object except in the way it is encoded in the byte buffer. Accordingly, if the packet code generator parses an OBJ container object from a .Ob file, it generates code to encode/decode members of the OBJ object into a byte buffer. However, an OBJ container object also requires CLASS_ID and CTYPE fields which determine the type of the OBJ object. During encoding of the OBJ object into byte buffer, the length of the object is encoded first (e.g., in 2 bytes), followed by CLASS_ID (e.g., 1 byte) and the CTYPE (e.g., 1 byte) fields. During encoding of the OBJ object, the packet code generator can also align the total size of the buffer length at a 4 bytes boundary for padding.

XITEM—XITEM container object is identical to a PKT container, except in that it is used only to point to other container objects. For example, an XITEM container object can be included in a different container object to point to a list of other container objects. The list itself should also be an XITEM container object, and each XITEM in the list should itself be an XITEM container object.

DTLV and DPKT—The DTLV and DPKT container objects each include all of the features of the TLV and PKT container objects respectively. In addition, they each can define the basic data type members to be encoded as Type+Length+Data rather than to be encoded as simply Data. Examples are listed in the sections below.

The following example types of members can be recognized inside container objects by an example packet code generator:

TABLE 1

| Type | Description | Encoding format | Notes |
| --- | --- | --- | --- |
| bool | Represents a basic Boolean data type | Encoded as 1 byte; true = 1 and false = 0 | |
| uint8 | Represents a one byte unsigned field | Encoded as 1 byte | |
| sint8 | Represents a one byte signed field | Encoded as 1 byte | |
| uint16 | Represents a two byte unsigned field | Encoded as 2 bytes in network byte order | |
| sint16 | Represents a two byte signed field | Encoded as 2 bytes in network byte order | |
| uint32 | Represents a four byte unsigned field | Encoded as 4 bytes in network byte order | |
| sint32 | Represents a four byte signed field | Encoded as 4 bytes in network byte order | |
| float32 | Represents a four byte single-precision float value | Encoded as 4 bytes in network byte order. Assumes the float representation of the platform is in IEEE754 format (which is the case currently with the qcc compiler) and decoded in IEEE 754 format. | |
| string | Represents a character array terminated by a null character | Encoded as the first 2 bytes representing the length of the string followed by 'n' number of bytes for the contents of the string | |
| conststring | Represents a character array terminated by a null character. | Encoded always as a fixed 'n' number of bytes equal to the max length of the string. | Provided only for backward compatibility reasons. Should not be used for new definitions. |
| listitem | Represents a list of similar items. | Encoded as first 2 bytes representing number of objects followed by 'n' number of objects | Provided only for backward compatibility reasons. Should not be used for new definitions. Use listtlv instead. |
| listconstitem | Represents a list of similar items | All items are encoded one by one into the buffer. Always max number of list items are encoded | Provided only for backward compatibility reasons. Should not be used for new definitions. |

TABLE 1-continued

| Type | Description | Encoding format | Notes |
| --- | --- | --- | --- |
| | | | However some standard objects are also in this format. Use listtlv instead |
| listtlv | Represents a list of TLVs | Each TLV is encoded one by one into the buffer | |
| listptlv | Represents a list of PTLVs | Each PTLV is encoded one by one into the buffer | This type is only recognized by the Java packet compiler. |
| listobj | Represents a list of OBJs | Each OBJ is encoded one by one into the buffer | |
| rawbuf | Represents a raw buffer of variable size | Encoded as first 2 bytes as the length of the raw buffer followed by 'n' number of bytes of the raw buffer | |
| constrawbuf | Represents a raw buffer of fixed size | Encodes as 'max' number of bytes into the byte buffer | Provided only for backward compatibility reasons. Should not be used for new definitions. |
| reftlv | Represents a reference to a TLV object within a container | Encoded as the first 2 bytes representing a, TLV_TYPE, the next 2 bytes as TLV_LEN and then each TLV member is encoded. The encoded length is 4 bytes aligned | |
| refobj | Represents a reference to an OBJ object within a container | Encoded as first 2 bytes representing OBJ_LEN, next 1 byte as CLASS_ID followed by 1 byte of CTYPE, then each OBJ member is encoded. The encoded length is 4 bytes aligned | |
| refpkthdr | Represents a reference to a PKTHDR object within a container | Encoded as per the members of the referenced PKTHDR | |
| refpkt | Represents a reference to a PKT object within a container | Encoded as per the members of the referenced PKT | |

The .Ob files can follow a standard format for interpretation by the packet code generator. For example, .Ob files can include certain key words, and can follow a particular naming format. In the examples herein, .Ob files use the key words "package" and "import" however it is noted that any suitable key words can be used. In this example, each .Ob file begins with the key word "package." The package key word is used to define the relative location of the .Ob file in the complete source tree for the application. In this example .Ob file, package is a mandatory keyword, and is required to be the first line in the file. The import key word is used to specify the relative path to other objects in the source tree, if it is desired to refer to other objects within the definition.

Figure 4:
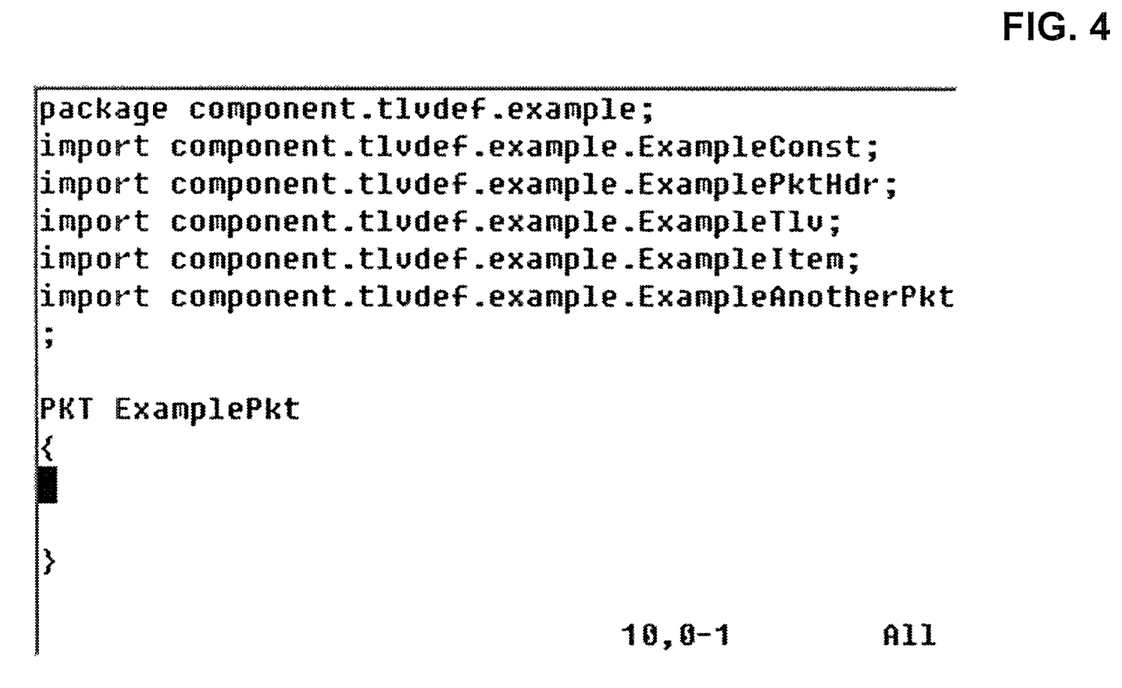
FIG. 4 is a partial listing of an example data container file.

To declare a container object, the .Ob file name in this example must match with the name of the container object defined in the .Ob file. An example of how the PKT, PKTHDR, XITEM object types are defined in this example is shown in FIG. 4—i.e., object type followed by its name. For example, the object type can be defined as "PKT ExamplePkt" or "PKTHDR ExamplePkthdr" or "XITEM ExampleXitem" in the .Ob file.

Figure 5:
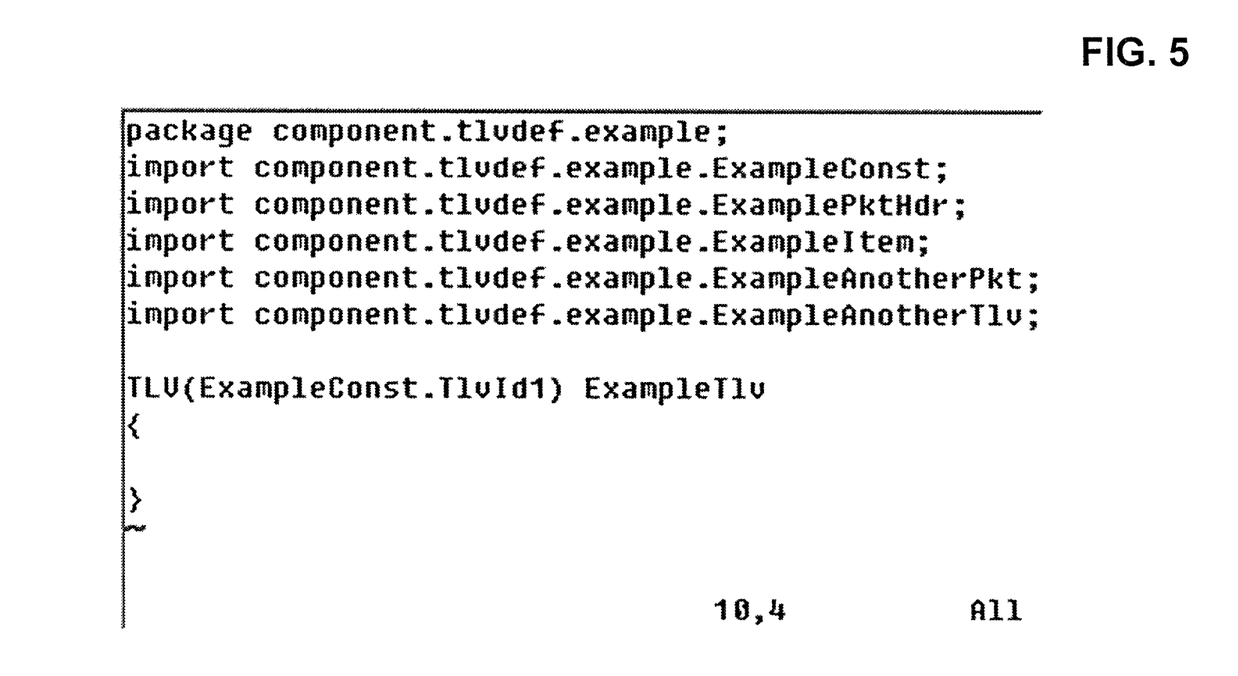
FIG. 5 is a partial listing of another example data container file.

A TLV container object is defined differently from PKT, PKTHDR, XITEM object types because it is required to provide a unique TLV ID. In this example, the notation TLV_ID is used instead of TLV_TYPE. The TLV container object is defined as shown in FIG. 5—i.e., object type followed by an argument defining the TLV ID, followed by its name. For example, the object type can be defined as "TLV(ExampleConst.TlvId1) ExampleTLV". ExampleConst.TlvId1 refers to another container object (i.e., a constant object) where the user has specified an integer for use as the unique TLV ID used by the TLV object. ExampleTLV is the name of the example TLV container object.

Figure 6:
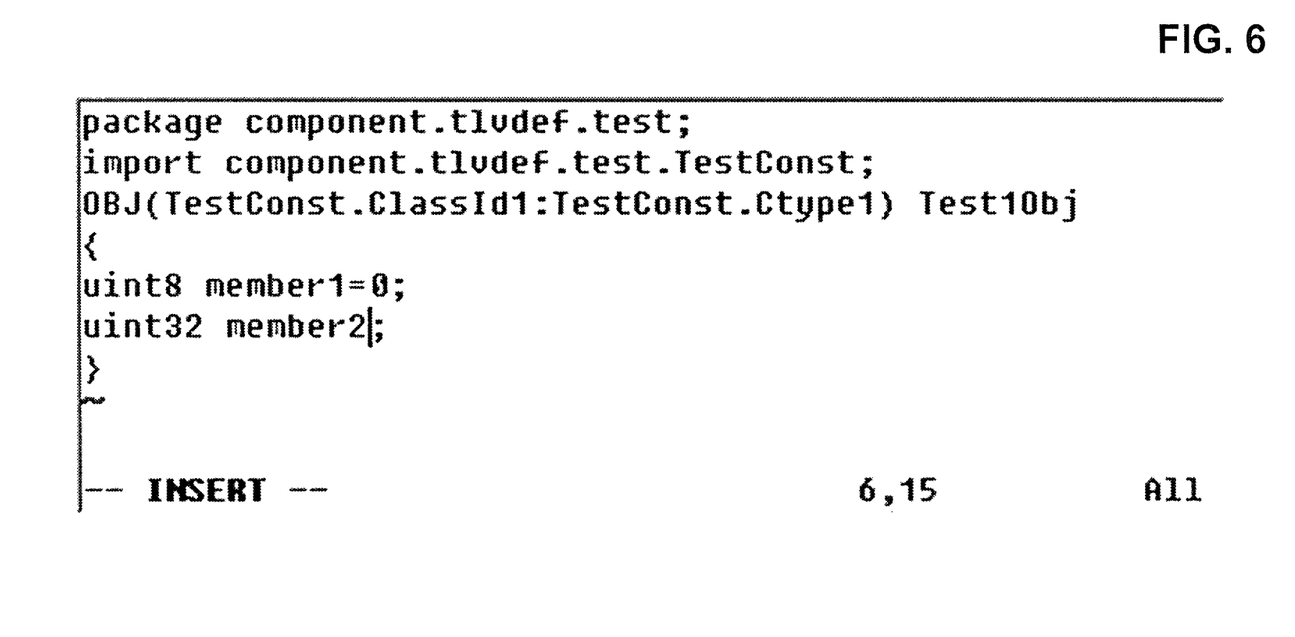
FIG. 6 is a partial listing of another example data container file.

An OBJ container object is defined differently from TLV, PKT, PKTHDR, and XITEM, because it must provide a unique CLASSID and CTYPE. The OBJ container object in this example is defined as shown in FIG. 6. In this example, CLASSID and CTYPE are separated by a colon. For example, the object type can be defined as "OBJ(TestConst.ClassId1:TestConst.Ctype1) Test1Obj" where TestConst.ClassId1:TestConst.Ctype1 are constant container objects where the user has specified the unique CLASSID and CTYPE respectively, and Test1Obj is the name of the example OBJ container object.

A TLVCONST container object requires that its members are initialized at declaration time. This requirement helps to avoid sending uninitialized values on the network while encoding packets. Only following types of members are allowed inside TLVCONST object: uint8; uint16; uint32; sint8; sint16; sint32; bool.

An example syntax for declaring members is defined below. In general the format is:
  MemberType <TLVID><member_name>;
The basic data type members can also be initialized at the time of declaration as follows:
  MemberType <TLVID><member_name>=<Value>;
The <TLVID> is optional and can be provided only if the basic data types are defined within DTLV/DPKT containers.

In general, any variable length member requires a maximum length ("max length") to be provided. Max length can be declared within brackets ([ ]) after the type of the member. For example, the following expression declares a string member with max length of 100 bytes:
  conststring[100]_member_;
The literal '100' can also be replaced by a reference to a constant integer. Similarly, the following expression declares a rawbuf member with a max size of 200 bytes:
  rawbuf[200]_member_;
The packet code generator can generate code which will assert an error condition whether the user tries to exceed these limits at run time.

Figure 7:
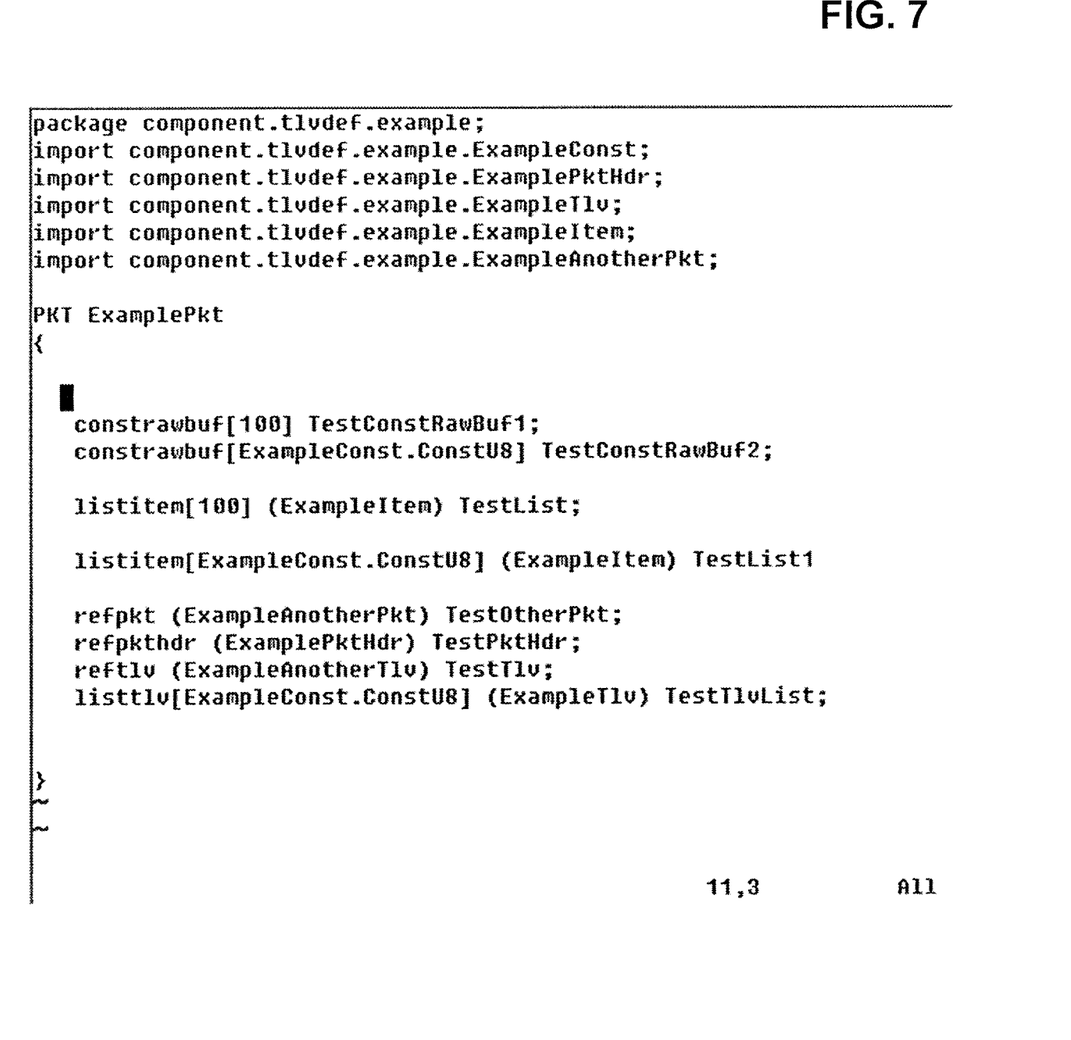
FIG. 7 is a partial listing of another example data container file.

FIG. 7 illustrates an example PKT container object which includes various example member type declarations. For example,
  constrawbuf[100] TestConstRawBuf1;
  constrawbuf[ExampleConst.ConstU8] TestConstRawBuf2;
  listitem[100] (ExampleItem) TestList;
  listietm [ExampleConst. ConstU8] (ExampleItem) TestList1
  refpkt (ExampleAnotherPkt) TestOtherPkt;
  refpkthdr (ExamplePktHdr) TestPktHdr;
  reftiv (ExampleAnotherTlv) TestTlv;
  listtiv[ExampleConst.ConstU8] (ExampleTlv) TestTlvList;

Certain members have additional aspects which can be referred to as "facets". Members reftiv and refobj each include an additional facet to declare the member as mandatory or optional. This mandatory or optional facet specifies whether the TLV or OBJ container object must be present at the time of encoding. In this example syntax, if the facet is absent, it is assumed that it is mandatory for the container object to be present at the time of encoding.

Figure 8:
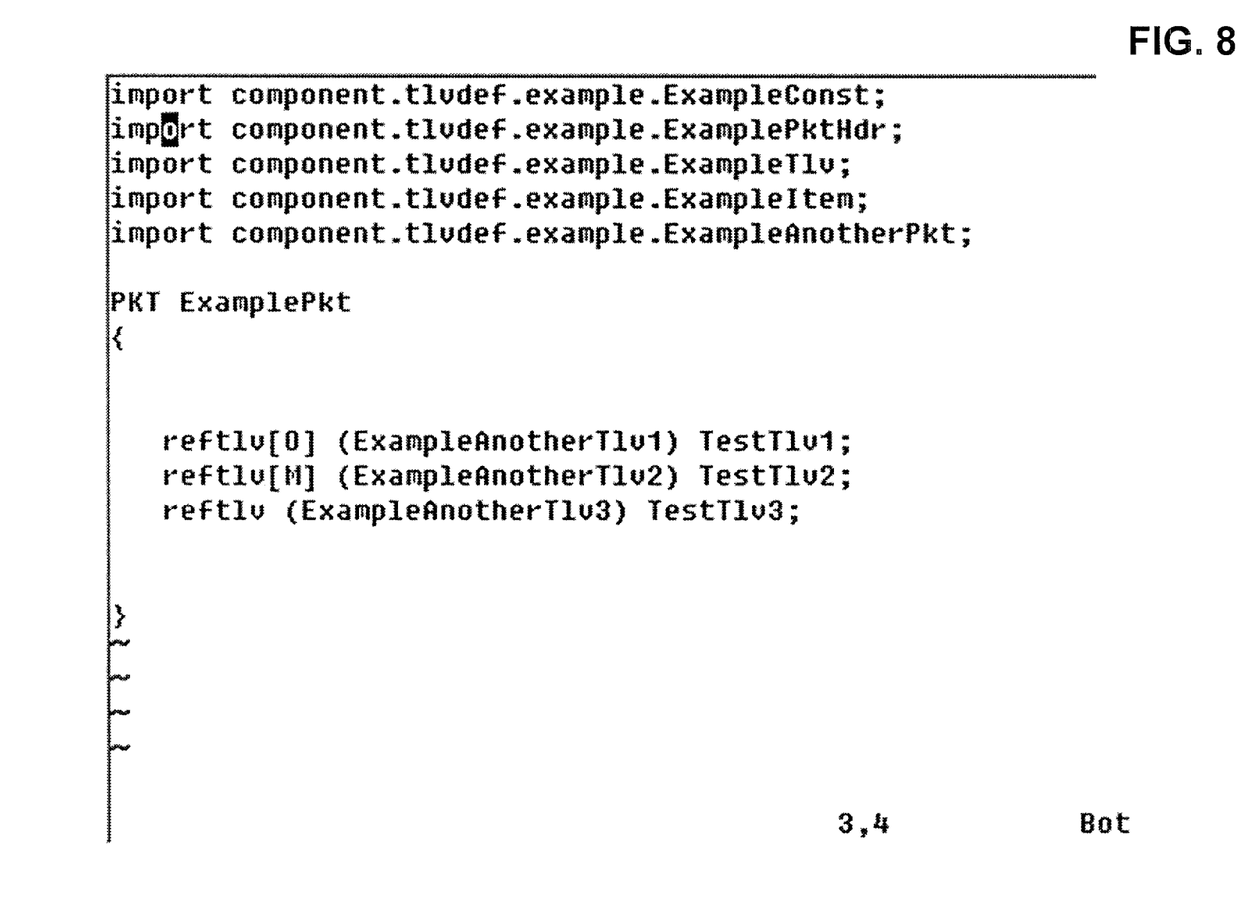
FIG. 8 is a partial listing of another example data container file.

FIG. 8 shows examples of this syntax. For example, the member reftiv[O] (ExampleAnotherTlv1) TestTLV1; indicates that it is optional whether container object ExampleAnotherTlv1 is present when the packet code generator generates the C++ code (because the facet has a value of O). Further, the member reftiv[M] (ExampleAnotherTlv2) TestTlv2; indicates that it is mandatory that container object ExampleAnotherTlv2 be present when the packet code generator generates the C++ code (because the facet has a value of M). Still further, the member reftiv (ExampleAnotherTlv3) TestTlv3; indicates that it is mandatory that container object ExampleAnotherTlv2 be present when the packet code generator generates the C++ code (because the facet is absent in this example, it is assumed to be mandatory).

If a member is specified with (or defaults to) a mandatory facet, C++ code generated from that .Ob file will assert an error condition if user has not set the contents of the member at the time the C++ code is generated.

The packet code generator can generate a .cpp and .h file for each .Ob file it compiles. The .cpp and .h files are C++ source code files which can be compiled by a C++ compiler. It is noted that other kinds of source code files, additional source code files, or a single source code file can be generated by the packet code generator; e.g., if it is configured for another language (e.g., Java, etc.). The names of the .cpp and .h files are related to the container object name used in the .Ob file. In the example herein, the generated file names would be of the form:
  <ContainerObjectName>Ob.cpp
  <ContainerObjectName>Ob.h
In the example herein, the generated files will contain a C++ class with a name of the form:
  <ContainerObjectName>Ob
It is noted however that any suitable naming convention can be used. The generated C++ class contains methods to get/set the members specified in the .Ob file, as well as some generic methods to control the behavior of the class. The following tables 2, 3 and 4 describe how the methods are defined, and their purpose. Each container object class can also have certain methods to operate on the object itself. The PKTHDR container class will also have additional 'Get' methods for faster decoding of the fixed size members, as also described below.

TABLE 2

| Member dependent methods | |
| --- | --- |
| Type | Methods |
| bool | bool Get<MemberName>( ); |
| | void Set<MemberName>(bool value); |
| uint8 | uint8 Get<MemberName>( ); |
| | void Set<MemberName>(uint8 value); |

TABLE 2-continued

Member dependent methods

| Type | Methods |
|---|---|
| sint8 | sint8 Get<MemberName>( );<br>void Set<MemberName>(sint8 value); |
| uint16 | uint16 Get<MemberName>( );<br>void Set<MemberName>(uint16 value); |
| sint16 | sint16 Get<MemberName>( );<br>void Set<MemberName>(sint16 value); |
| uint32 | uint32 Get<MemberName>( );<br>void Set<MemberName>(uint32 value); |
| sint32 | sint32 Get<MemberName>( );<br>void Set<MemberName>(sint32 value); |
| float32 | float32 Get<MemberName>( );<br>void Set<MemberName>(float32 value); |
| string | const char *Get<MemberName>( );<br>void Set<MemberName>(const char *val); |
| conststring | const char *Get<MemberName>( );<br>void Set<MemberName>(const char *val); |
| Listitem | Clear<ListName>List( );<br>vector< ListItemType * > &<br>Get<ListName>ListVector( );<br>uint32 Get<ListName>ListSize( );<br><ListItemType> * Get<ListName>ListItem(uint32 idx);<br>void InsertTo<ListName>List(uint32 idx,<br>ListItemType *item );<br>void AppendTo<ListName>List(ListItemType *Item);<br>void RemoveFrom<ListName>List(uint32 idx); |
| listconstitem | Same as for listitem |
| Listtlv | Same as for listitem except the Listitem type is of type TLV |
| Listobj | Same as for listitem except the Listitem type is of type OBJ |
| listuint8,<br>listuint16 . . .<br>(All basic data<br>type lists) | Clear<ListName>List( );<br>vector< DataType > & Get<ListName>ListVector( );<br>uint32 Get<ListName>ListSize( );<br>< DataType> Get<ListName>ListItem(uint32 idx);<br>void InsertTo<ListName>List(uint32 idx, DataType);<br>void AppendTo<ListName>List(DataType);<br>void RemoveFrom<ListName>List(uint32 idx);<br>NOTE: No pointers. All functions are call-by-value |
| rawbuf | uint8 * Get<MemberName>Ptr( );<br>uint16 Get<MemberName>Len( );<br>uint16 Get<MemberName>MaxLen( );<br>void Allocate<MemberName>Ptr(uint16 size); |
| constrawbuf | uint8 * Get<MemberName>Ptr( );<br>uint16 Get<MemberName>Len( );<br>uint16 Get<MemberName>MaxLen( ); |
| reftlv | TlvTypeObject *Get<MemberName>Ptr( ); |
| refobj | ObjTypeObject *Get<MemberName>Ptr( ); |
| refpkthdr | PktHdrTypeObject *Get<MemberName>Ptr( ); |
| refpkt | PktTypeObject *Get<MemberName>Ptr( ); |

TABLE 3

| Type | Methods |
|---|---|
| | Additional member methods |
| All basic<br>data types | bool Is<MemberName>Set( );<br>This method will be generated when a basic data type<br>is defined with implied tlv id and with ref type [o]<br>or Compile Option DEF_DECODE_MANDATORY =<br>FALSE. This method will return TRUE if the data type<br>was decoded successfully. |
| | Additional Get methods for PKTHDR object container class<br>The *ptr passed to methods is the location in the received<br>packet buffer where this (PKTHDR) object begins. |
| bool | bool Get<MemberName>(uint8 *ptr); |
| uint8 | uint8 Get<MemberName>( uint8 *ptr); |
| sint8 | sint8 Get<MemberName>( uint8 *ptr); |
| uint16 | uint16 Get<MemberName>( uint8 *ptr); |
| sint16 | sint16 Get<MemberName>( uint8 *ptr); |
| uint32 | uint32 Get<MemberName>( uint8 *ptr); |
| sint32 | sint32 Get<MemberName>( uint8 *ptr); |
| conststring | const char *Get<MemberName>( uint8 *ptr); |
| constrawbuf | uint8 *Get<MemberName>Ptr(uint8 *ptr);<br>uint16 *Get<MemberName>Len(uint8 *ptr); |

TABLE 4

Container Class methods

| Type | Methods |
|---|---|
| void Dump(std::ostream& os) const; | The container class contents can be Dumped using this. |
| uint16 Get<PKTHDR ObjectClass>Size( ); | Provides the size of fixed size PKTHDR object. This is available only for PKTHDR container class objects. |
| void GenerateNv(NvWriter& Wr); | Generates Nv message for the whole class. The Nv message contains the class members in TNLV format. The method uses the current values of the class members to generate the Nv message |
| void ApplyNv(NvReader* Rdr); | Applies the contents of the NV message on the class members. Usually NV related methods are invoked when container class object has to be passed between two subsystems using Nv messages |
| uint32 GetEncodeLen( ); | Determines the length of the buffer required to encode all the members of the class. |
| uint32 EncodeBuffer(uint8 *BufPtr); | Encodes the class members into the byte buffer as per encoding rules of each member |

TABLE 4-continued

Container Class methods

| Type | Methods |
| --- | --- |
| uint32 DecodeBuffer(uint8 *BufPtr,uint32 Len); | Decodes a byte buffer into the members of the class |
| vector <UnknownTlv *> & GetUnknownTlvVector( ); | During decoding of a buffer if unknown TLVs are found then they are appended to a vector. This method returns a referenced to the Vector |
| uint32 GetUnknownTlvListSize( ); | Gets the size of the UnknownTlvVector |
| UnknownTlv* GetUnknownTlv(uint32 idx); | Method to get a particular UnknownTlv from the vector |
| void SetUnknownTlvVectorForTx(vector<UnknownTlv *> & UnTxVect); | This has been provided as a special case where received unknown TLVs are sent back. |

Figure 9:
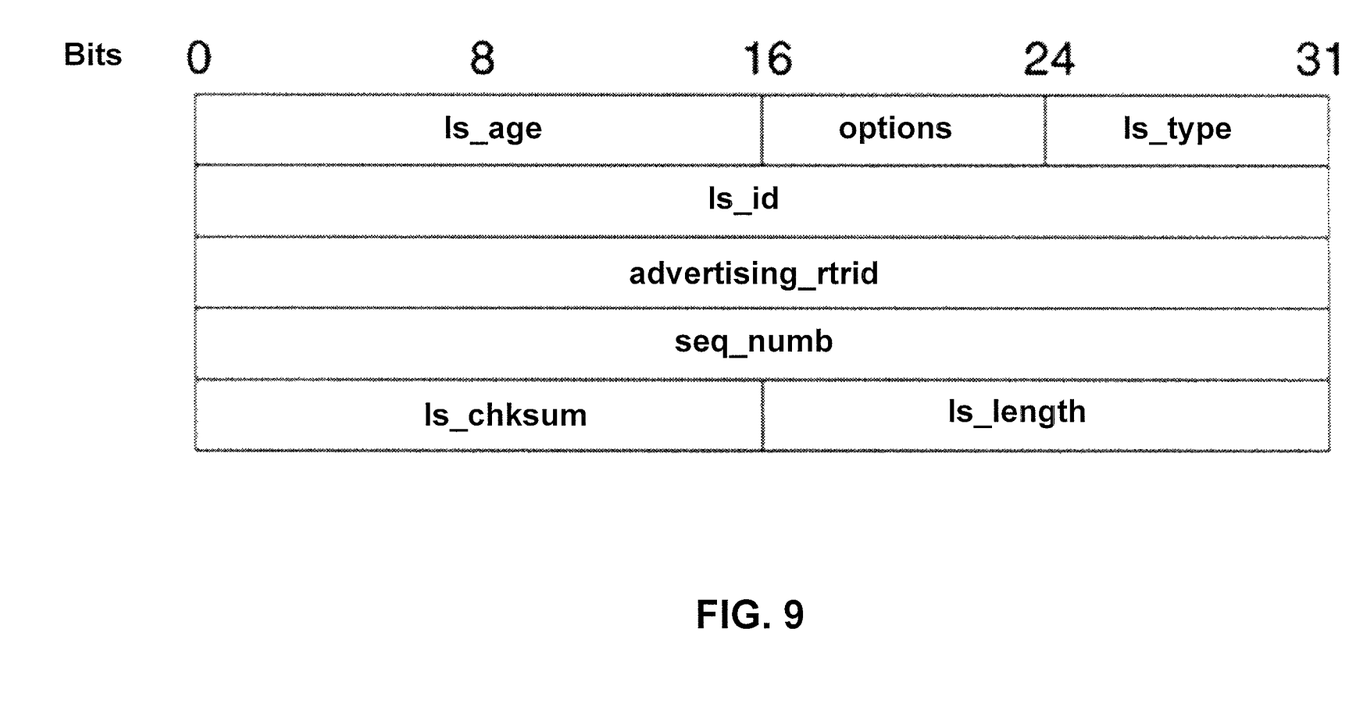
FIG. 9 is an example buffer encoding diagram.

The packet code generator can also be capable of generating diagrams for encoding of the byte buffer. This can have the advantage of allowing the user to easily see how data is encoded in the buffer before being sent on the network. FIG. 9 is a block diagram illustrating an example packet diagram generated by a packet code generator for a .Ob file of the following form:

```
PKTHDR LsaHeader
{
    uint16 ls_age;
    uint8 options;
    uint8 ls_type;
    uint32 ls_id;
    uint32 advertising_rtrid;
    uint32 seq_num;
    uint16 ls_chksum;
    uint16 ls_length;
}
```

The packet code generator can also be capable of calculating the maximum size of the packets statically. To calculate the maximum packet sizes statically, the packet code generator can parse the .Ob files and produce a report of the maximum size of various packet types. The memory report can be used to analyze memory requirements of a target system on which the application is run, and where the packets are processed.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
   parsing a data container definition file to determine a packet format;
   generating a code file based on the data container definition file;
   inserting the code file into a source tree of an application;
   compiling the source tree to generate an executable file;
   executing the executable on a computing device in communication with a communications network, wherein the executable file encodes packets in the packet format and writes the packets into a packet buffer;
   determining a number of pad bytes to be stored in the packet buffer;
   storing the packets in the packet buffer such that a length of the packet buffer is aligned at a boundary to provide padding; and
   transmitting the packets from the packet buffer to the communications network for data exchange over the communications network.

2. The method of claim 1, wherein the data container definition file comprises a container object.

3. The method of claim 1, wherein the data container definition file comprises a member.

4. The method of claim 1, wherein the data container definition file specifies a path to an object in another file.

5. The method of claim 1, wherein the code file comprises a class based on the data container definition file.

6. The method of claim 1, further comprising calculating a maximum packet size based on the data container definition file.

7. The method of claim 1, wherein the data container definition file specifies the packet format for a communications protocol.

8. A method in accordance with claim 1, wherein the boundary has a predetermined length in bytes.

9. A device comprising:
processing circuitry;
memory circuitry in communication with the processing circuitry;
the processing circuitry configured to parse a data container definition file to determine a packet format;
the processing circuitry further configured to generate a code file based on the data container definition file;
the processing circuitry further configured to insert the code file into a source tree of an application;
the processing circuitry further configured to compile the source tree to generate an executable file;
the processing circuitry further configured to execute the executable file to encode packets in the packet format, write the packets into a packet buffer, and transmit the packets from the packet buffer to a communication network for data exchange over the communications network;
the processing circuitry being configured to determine a number of pad bytes to be stored in the packet buffer; and
storing the packets in the packet buffer such that a length of the packet buffer is aligned at a boundary to provide padding, the packets being stored in the packet buffer prior to said transmitting the packet.

10. The device of claim 9, wherein the data container definition file comprises a container object.

11. The device of claim 9, wherein the data container definition file comprises a member.

12. The device of claim 9, wherein the data container definition file specifies a path to an object in another file.

13. The device of claim 9, wherein the code file comprises a class based on the data container definition file.

14. The device of claim 9, wherein the processing circuitry is further configured to calculate a maximum packet size based on the data container definition file.

15. The device of claim 9, wherein the data container definition file specifies the packet format for a communications protocol.

16. A non-transitory computer readable medium having instructions stored thereon which when executed by processing circuitry causes the processing circuitry to execute a method comprising:
parsing a data container definition file to determine a packet format;
generating a code file based on the data container definition file;
inserting the code file into a source tree of an application;
compiling the source tree to generate an executable file;
executing the executable on a computing device in communication with a communications network, wherein the executable file encodes packets in the packet format and writes the packets into a packet buffer; and
determining a number of pad bytes to be stored in the packet buffer;
storing the packets in the packet buffer such that a length of the packet buffer is aligned at a boundary to provide padding; and
transmitting the packets from the packet buffer to a communications network for data exchange over the communications network.

17. The non-transitory computer readable medium of claim 16, wherein the data container definition file comprises a container object.

18. The non-transitory computer readable medium of claim 16, wherein the data container definition file comprises a member.

19. The non-transitory computer readable medium of claim 16, wherein the data container definition file specifies a path to an object in another file.

20. The non-transitory computer readable medium of claim 16, wherein the code file comprises a class based on the data container definition file.

21. The non-transitory computer readable medium of claim 16, wherein the data container definition file specifies the packet format for a communications protocol.

* * * * *